United States Patent
Nir

(10) Patent No.: US 9,905,221 B2
(45) Date of Patent: Feb. 27, 2018

(54) AUTOMATIC GENERATION OF A DATABASE FOR SPEECH RECOGNITION FROM VIDEO CAPTIONS

(71) Applicant: Igal Nir, Lehavim (IL)

(72) Inventor: Igal Nir, Lehavim (IL)

( * ) Notice: Subject to any disclaimer, the term of this patent is extended or adjusted under 35 U.S.C. 154(b) by 0 days.

(21) Appl. No.: 14/777,541

(22) PCT Filed: Mar. 9, 2014

(86) PCT No.: PCT/IL2014/050234
§ 371 (c)(1),
(2) Date: Sep. 16, 2015

(87) PCT Pub. No.: WO2014/162310
PCT Pub. Date: Oct. 9, 2014

(65) Prior Publication Data
US 2016/0293160 A1 Oct. 6, 2016

(30) Foreign Application Priority Data

Apr. 2, 2013 (IL) .......................................... 225540

(51) Int. Cl.
| | |
|---|---|
| *G10L 15/06* | (2013.01) |
| *G06F 17/30* | (2006.01) |
| *G10L 15/26* | (2006.01) |
| *G10L 15/04* | (2013.01) |
| *G10L 15/08* | (2006.01) |

(52) U.S. Cl.
CPC .......... *G10L 15/06* (2013.01); *G06F 17/3079* (2013.01); *G06F 17/30292* (2013.01); *G06F 17/30746* (2013.01); *G06F 17/30787* (2013.01); *G06F 17/30796* (2013.01);
(Continued)

(58) Field of Classification Search
CPC ....................................................... G10L 15/06
See application file for complete search history.

(56) References Cited

U.S. PATENT DOCUMENTS

| | | | |
|---|---|---|---|
| 5,649,060 A | 7/1997 | Ellozy | |
| 6,243,676 B1 * | 6/2001 | Witteman | ......... G06F 17/30017 704/243 |

(Continued)

OTHER PUBLICATIONS

Kepuska, Rojanasthien, "Speech corpus generation from DVDs of Movies and TV series", Journal of International Technology and Information Management, Jan. 1, 2011; retrieved form the Internet: <http://www.thefreelibrary.com/Speech+corpus+generation+from+DVDs+of+movies+and+TV+series.-a0289621089>.

(Continued)

*Primary Examiner* — Douglas Godbold
(74) *Attorney, Agent, or Firm* — Manelli Selter PLLC; Edward J. Stemberger

(57) ABSTRACT

A system and method for automatic generation of a database for speech recognition, comprising: a source of text signals; a source of audio signals comprising an audio representation of said text signals; a text words separation module configured to separate said text into a string of text words; an audio words separation module configured to separate said audio signal into a string of audio words; and a matching module configured to receive said string of text words and said string of audio words and store each pair of matching text word and audio word in a database.

3 Claims, 6 Drawing Sheets

(52) U.S. Cl.
CPC .............. *G10L 15/04* (2013.01); *G10L 15/08* (2013.01); *G10L 15/26* (2013.01)

(56) References Cited

U.S. PATENT DOCUMENTS

| | | | | |
|---|---|---|---|---|
| 2002/0055950 A1* | 5/2002 | Witteman | ......... | G06F 17/30017 715/203 |
| 2007/0055695 A1 | 3/2007 | Dorai et al. | | |
| 2008/0077110 A1 | 1/2008 | Yurick et al. | | |
| 2008/0270110 A1* | 10/2008 | Yurick | .............. | G06F 17/30026 704/3 |
| 2008/0270138 A1* | 10/2008 | Knight | .............. | G06F 17/30026 704/260 |

OTHER PUBLICATIONS

International Search Report in PCT/IL2014/050234 dated Aug. 5, 2014.

* cited by examiner

AUTOMATIC GENERATION OF A DATABASE FOR SPEECH RECOGNITION FROM VIDEO CAPTIONS

TECHNOLOGY FIELD

The present invention pertains to the field of speech recognition.

BACKGROUND

Speech recognition (SR) is the automatic translation of spoken words into text. Many applications are offered nowadays including the SR feature, such as word processing and e-mail applications, file management applications and systems especially designed for people with disabilities. Some programs are for specific business settings, such as medical or legal transcription.

Speech recognition is also used for creating captions for a video clip or movie. The prevailing method compares a recorded word to a database of pre-recorded words.

U.S. Pat. No. 5,649,060 to IBM provides a method of automatically aligning a written transcript with speech in video and audio clips. An automatic speech recognizer decodes speech (recorded on a tape) and produces a file with a decoded text. This decoded text is then matched with the original written transcript via identification of similar words or clusters of words. The patent does not disclose using video captions as the text source, which involves both separating text from image in the video signal and detecting when a caption has changed.

US Published application No. 2007/0055695 to IBM provides a method of partitioning a video into a series of semantic units wherein each semantic unit relates to a thematic topic. The method extracts a plurality of keywords from speech content of each of a plurality of homogeneous segments of the video and merges semantically related segments.

SUMMARY

According to a first aspect of the present invention there is provided a system for automatic generation of a database for speech recognition, comprising: a source of video and audio signals, said video signal including text and said audio signal comprising a spoken representation of said text; a text detection module configured to receive said video signal and detect a text therein, said text detection module further configured to generate a timestamp at a first detection of each given text; an OCR module configured to produce a string of text words representing said text; an audio buffering module configured to receive and store said audio signal until a next timestamp is generated by said text detection module; a word separation module configured to receive said stored audio signal and separate it into a string of audio words; and a matching module configured to receive said string of text words and said string of audio words and store each pair of matching text word and audio word in a database.

According to a second aspect of the present invention there is provided a method of automatic generation of a database for speech recognition, comprising: receiving video and audio signals, said video signal including text and said audio signal comprising a spoken representation of said text; detecting a text in said received video signal; generating a timestamp at a first detection of a given text; producing a string of text words representing said text; receiving and storing said audio signal until a next timestamp is generated; separate said stored audio signal into a string of audio words; and matching pairs of said text string words and said audio string words; and storing said matched pairs.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PRESENT INVENTION

The present invention provides a system and method for automatically building a database of matching audio signals and words. The database may be used by speech recognition applications such as caption creating and/or translating. The database may also be used by text to speech (TTS) applications such as e-book readers and others.

Figure 1:
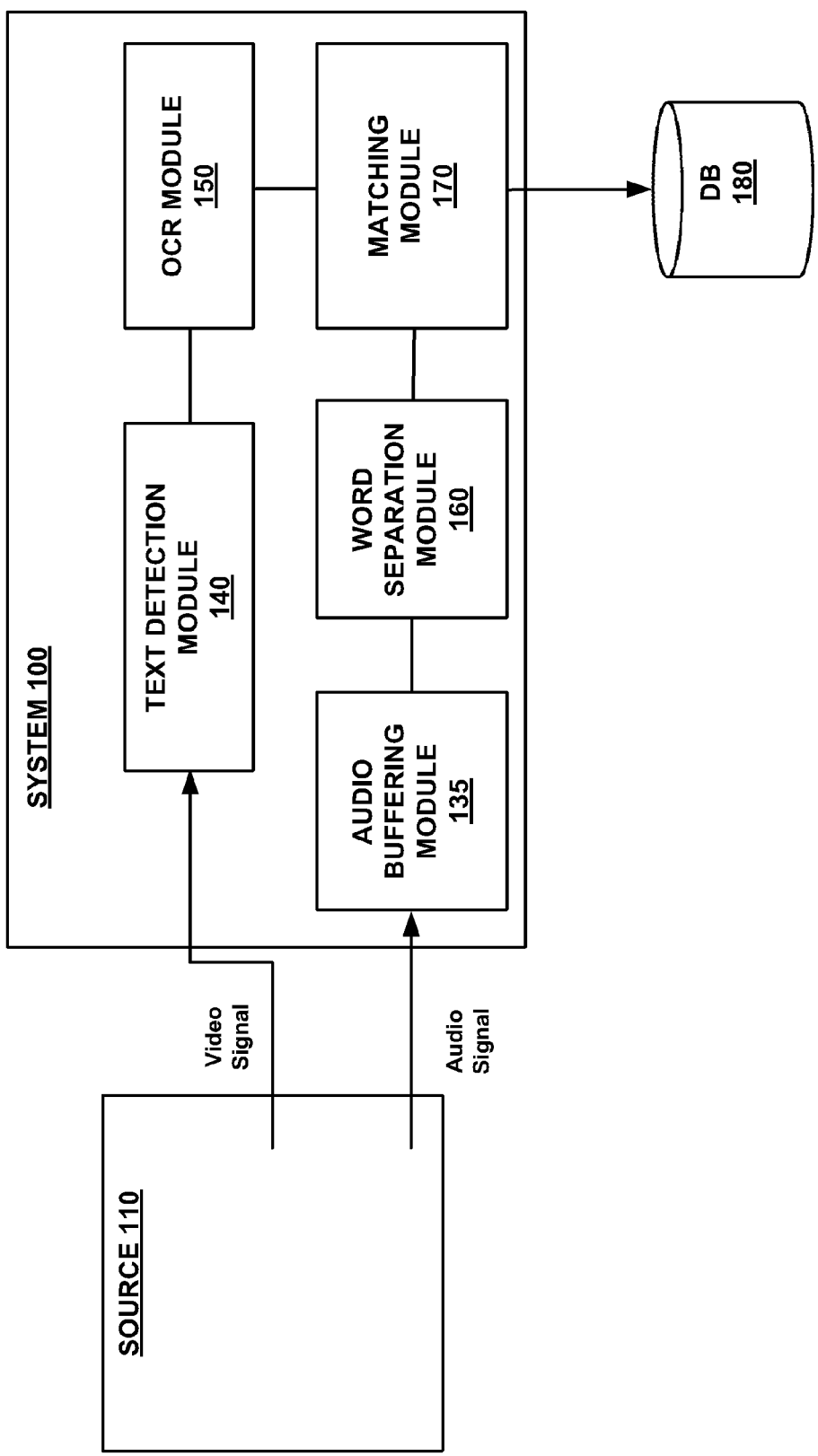
FIG. 1 is a schematic drawing showing the system according to a first embodiment of the present invention.

FIG. 1 is a schematic drawing showing the system according to a first embodiment of the present invention. The system 100 receives inputs from a source 110 such as, for example, a DVD player, a set-top-box or a streamer. The input includes video 120 and audio 130 signals, where the video signal includes text, e.g. subtitles and the audio signal is the spoken representation of the displayed text.

System 100 is a computerized system comprising a number of functional modules 140 through 170. Although some of the following description is written in terms that relate to software or firmware, embodiments may implement the features and functionality described herein in software, firmware, or hardware as desired, including any combination of software, firmware, and hardware.

Text detection module 140 receives the video frames from source 110 and searches the frame data for a text (e.g. subtitle) pattern.

OCR module 150 recognizes text words within the detected text.

Word separation module 160 receives the audio signal from source 110 and separates it into audio words.

Matching module 170 receives text words from OCR module 150 and audio words from word separation module 160, matches them and stores the matched pair in a database 180.

Figure 2:
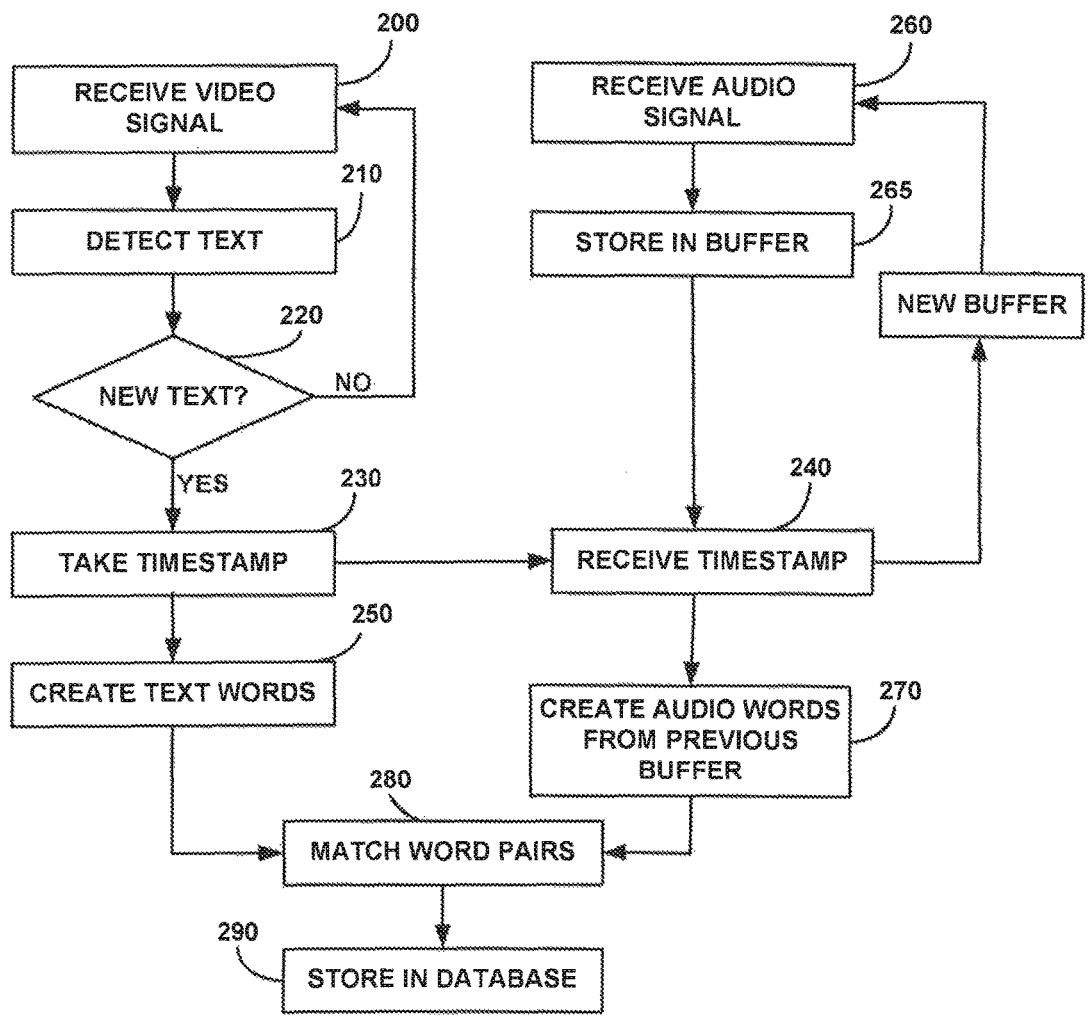
FIG. 2 is a flowchart showing the process according to the first embodiment.

FIG. 2 is a flowchart showing the process according to this first embodiment of the present invention.

In step 200 a video signal including text enters the text detection module.

In step 210 the text detection module searches for a text within the received video frame according to predefined criteria such as coordinates in the frame, background color, text color, horizontal lines, etc.

In step 220 the text detection module compares the detected text to the previously detected text. If the texts are identical, i.e. the text has not changed from the previous frame, the system waits for the next video frame. Otherwise, if a new text is detected, a timestamp is taken (step 230) and transferred to the audio buffering module (step 240) to mark the end (T_b) of the previous text and the beginning (T_a) of a new text (e.g. subtitle).

In step 250 the OCR module receives the frame with the text identification and processes it using any OCR method known in the art to produce a string of text words. For example, Tesseract, an open source OCR engine is provided in http://code.google.com/p/tesseract-ocr/

In step 260, the audio signal enters the audio buffering module, where the audio signals between time T_a and time T_b are stored (step 265).

In step 270, after timestamp T_b has been received from the text detection module, the stored audio string enters the word separation module, where it is separated into audio words using methods such as Lexical Segmentation, using techniques known in the art such as described in the document Lexical Segmentation in Spoken Word Recognition, by Matthew Harold Davis, which is incorporated herewith in its entirety.

The recognition of each lexical segment in turn requires its decomposition into a sequence of discrete phonetic segments and mapping each segment to one element of a finite set of elementary sounds (roughly, the phonemes of the language), such as implemented, for example, in Phonolyze™, a software application available from http://www.sprex.com/.

In step 280, the string of text words and the matching string of audio words are matched into pairs by the matching module and stored in the database (step 290).

Figure 3:
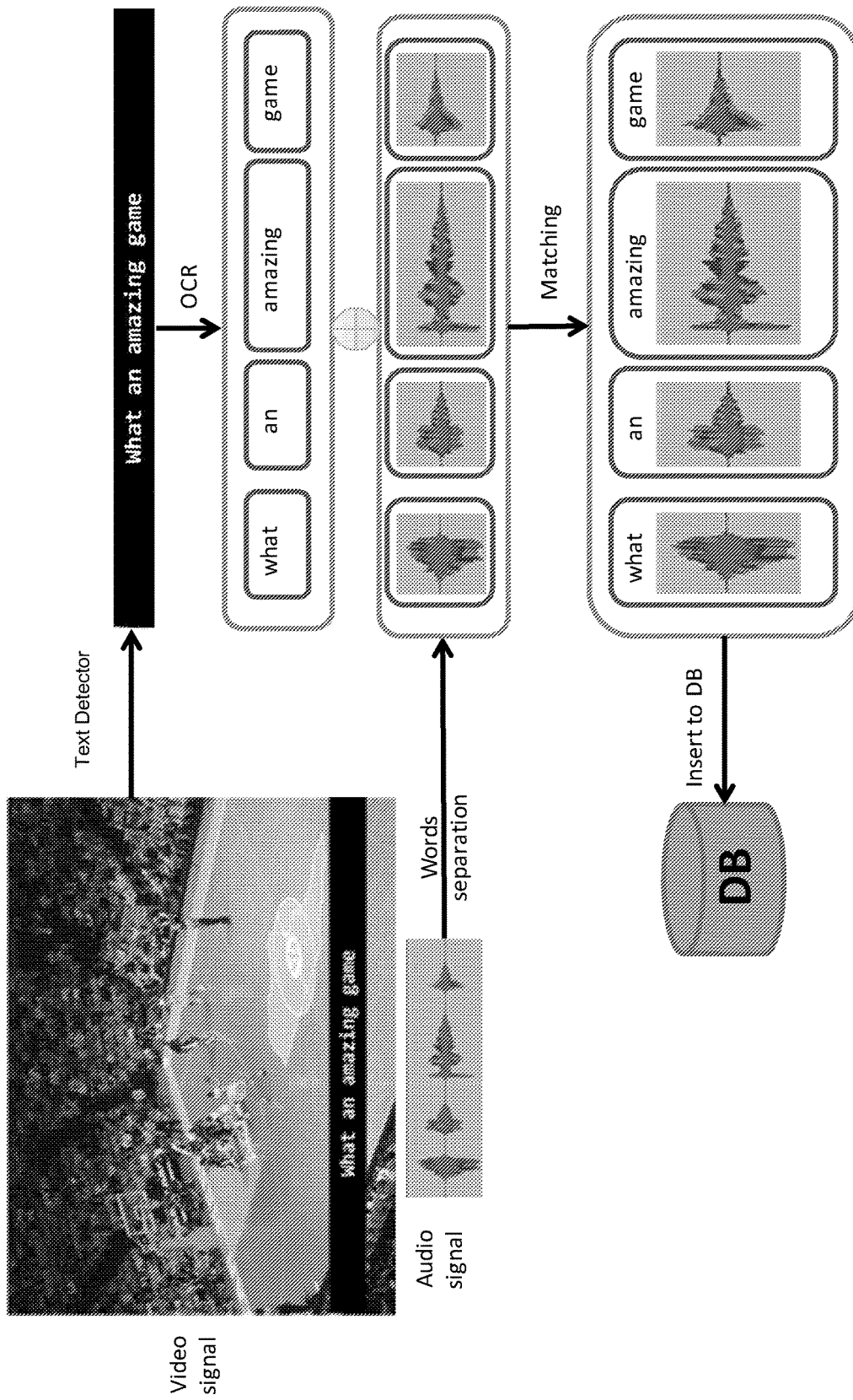
FIG. 3 shows an exemplary use of the system and method according to the first embodiment.

FIG. 3 shows an exemplary use of the system and method according to this first embodiment of the present invention.

Figure 4:
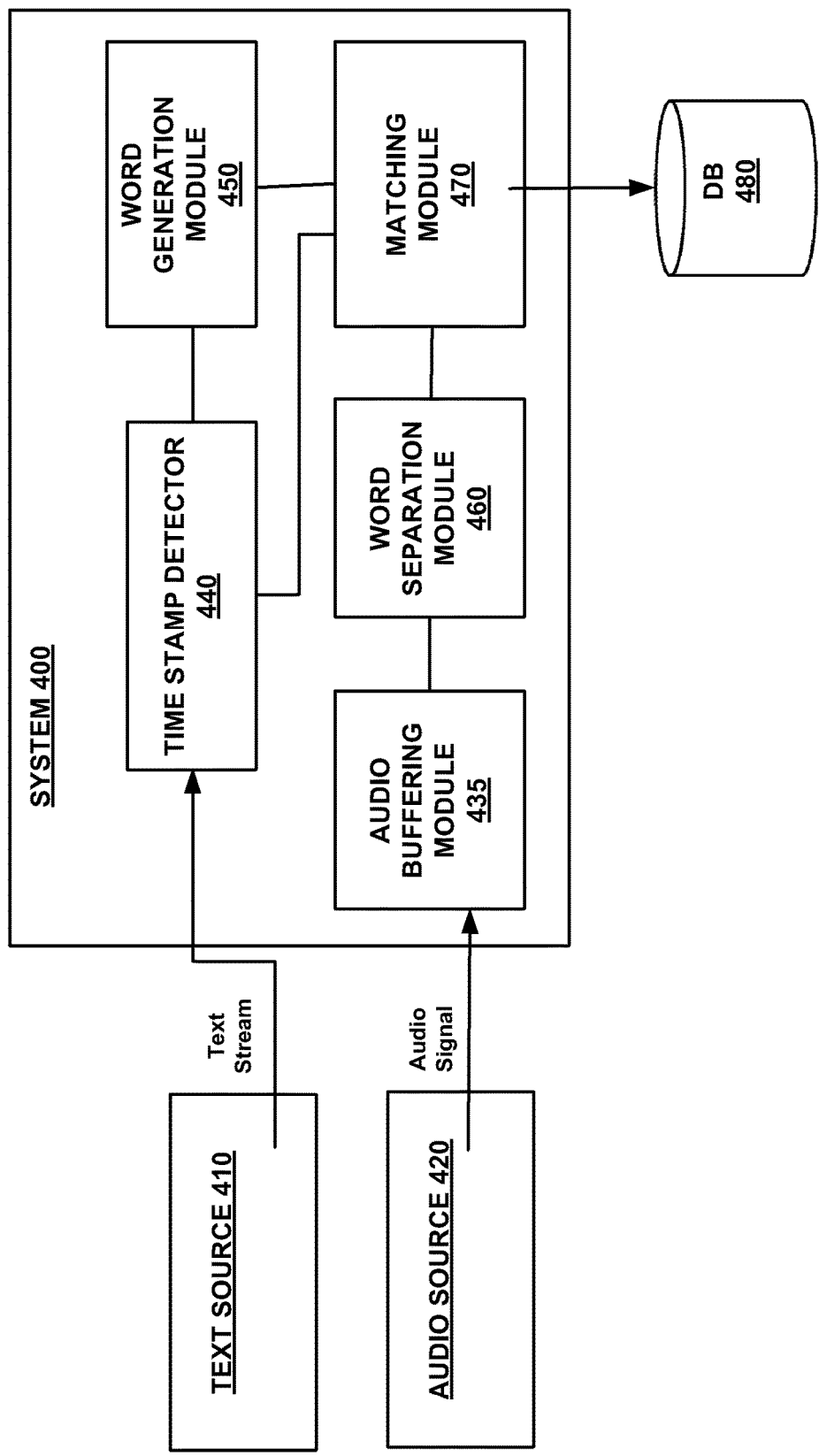
FIG. 4 is a schematic drawing showing the system according to a second embodiment of the present invention.

FIG. 4 is a schematic drawing showing the system according to a second embodiment of the present invention. The system 400 receives inputs from a text source 410, which is a transcript of an audio stream, such as, for example, lyrics of a song, text file comprising subtitles of a movie, text of an audio book, etc.

System 400 further receives input from an audio source 420, that corresponds to the text received from text source 410, namely a song, a movie sound track, an audio book, etc.

System 400 is a computerized system comprising a number of functional modules 435 through 470. Although some of the following description is written in terms that relate to software or firmware, embodiments may implement the features and functionality described herein in software, firmware, or hardware as desired, including any combination of software, firmware, and hardware.

Time stamp detection module 440 receives a text stream from text source 410, separates the text from the time stamps.

Word generation module 450 receives the text from time stamp detection module 440 and separates it into single words.

Audio buffering module 435 receives and stores the audio signal from audio source 420 in buffers. Each buffer stores audio signals arriving during a pre-defined length of time (e.g. 5 seconds).

Word separation module 460 receives a buffer from audio buffering module 435 and separates it into audio words.

Matching module 470 receives text words from word generation module 450 and audio words from word separation module 460, matches them and stores the matched pair in a database 480.

Figure 5:
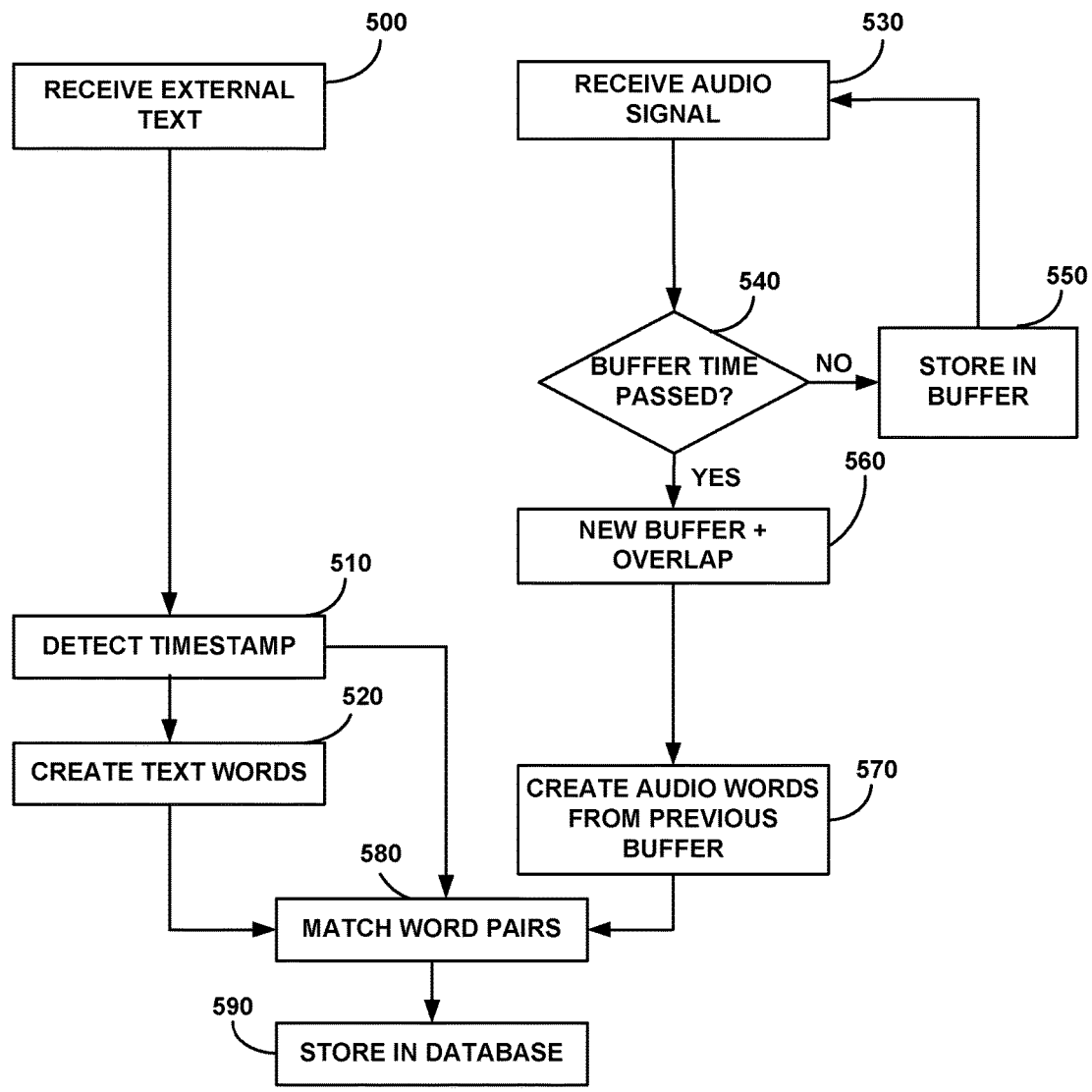
FIG. 5 is a flowchart showing the process according to the second embodiment.

FIG. 5 is a flowchart showing the process according to this second embodiment of the present invention.

In step 500 external text enters the time stamp detection module. The text is a transcript of an audio stream, such as, for example, lyrics of a song, text file comprising subtitles of a movie, text of an audio book, etc.

In step 510, if the text file contains timestamps, e.g. a subtitles text file, the timestamp detection module searches the text for time stamp patterns, according to the text file format. For example, a type .srt file may comprise rows such as:

1
00:00:20,000→00:00:24,400
what a beautiful day

The time stamp detection module separates the timestamps from the text, transfers the text to the word generation module and the timestamps to the matching module.

Alternatively, if the text file is a lyrics text file or an audio book, i.e. a text file with no time stamps, the timestamp detection module returns indication that no time stamps are within this session.

In step 520 the word generation module separates the text into single words.

In step 530 the audio buffering module receives an audio signal and checks (step 540) whether it is within the timeframe of the current buffer. If it is—the new audio signal is stored in the buffer (step 550). Otherwise—in step 560 a new buffer is created with a pre-defined time worth (e.g. 1 second) of audio signals from the end of the previous buffer, to create an overlap. The buffer overlap serves to prevent words being cut in the middle.

In step 570, the audio separation module separates the full audio buffer into audio words methods such as Lexical Segmentation, as described above in conjunction with the first embodiment.

In step 580, the string of text words and the matching string of audio words are matched into pairs by the matching module and stored in the database (step 590). The matching module uses the timestamps to synchronize the audio and text strings. If no timestamps exist in the text, it is assumed that the text and audio words are synchronized.

Figure 6:
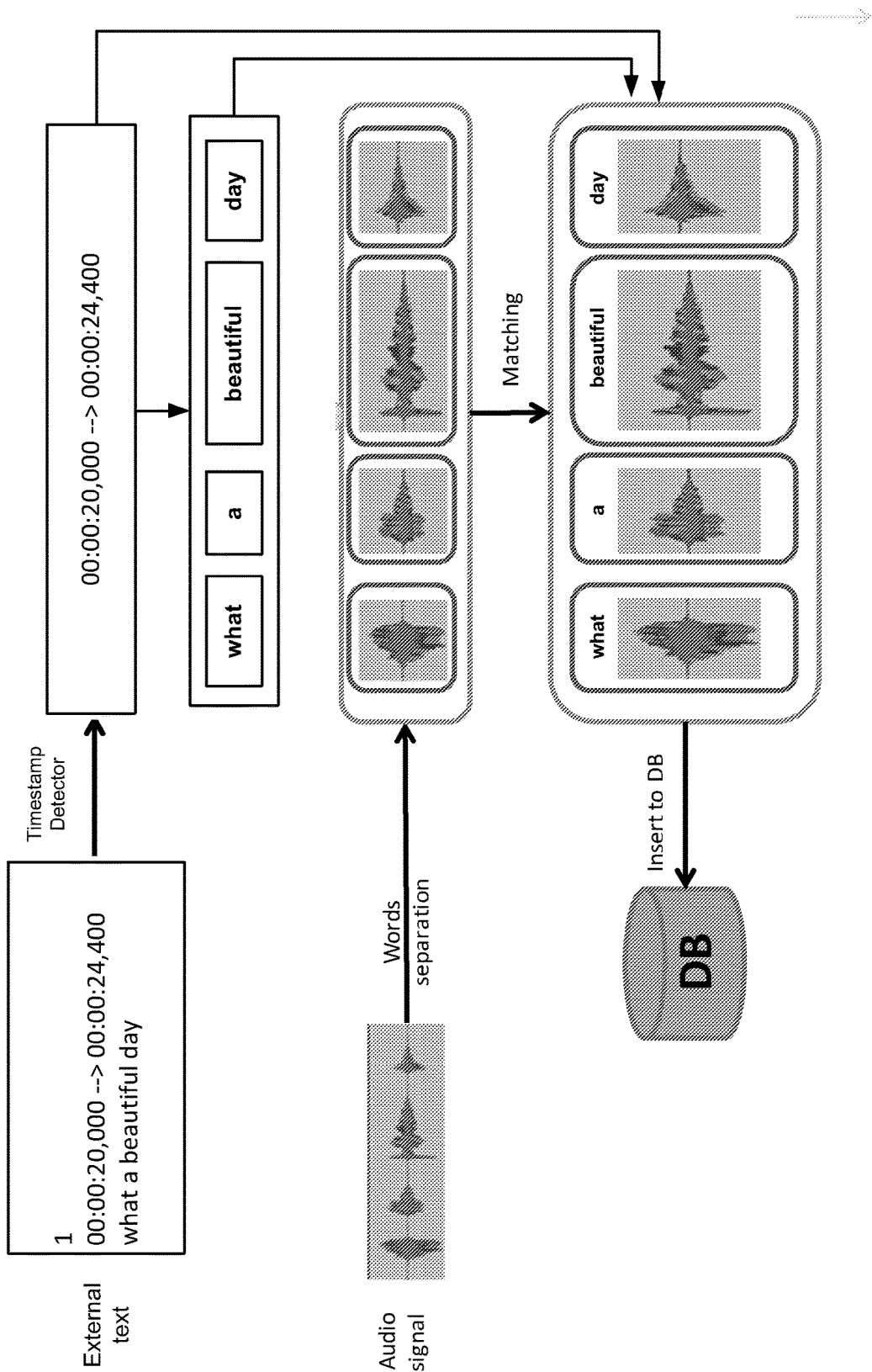
FIG. 6 shows an exemplary use of the system and method according to the second embodiment.

FIG. 6 shows an exemplary use of the system and method according to this second embodiment of the present invention.

The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

At least some of the subject matter described herein may be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other in a logical sense and typically interact through a communication network. The relationship of client and server may arise by virtue of computer programs running on the respective computers and having a client-server relationship to each other.

A number of embodiments have been described. Nevertheless, it will be understood that various modifications may be made without departing from the spirit and scope of the invention. Accordingly, other embodiments are within the scope of the following claims.

The invention claimed is:

1. A system for automatic generation of a database for speech recognition, comprising:
   a text subsystem;
   an audio subsystem configured to operate in synchronization with said text subsystem;
   a matching module; and
   a database of matching audio signals and text words;
wherein said text subsystem comprises:
   a source of video frames comprising text;
   a text detection module configured to receive a first video frame, detect the text therein by looking for text patterns and generate a first timestamp if the detected text in said first video frame is different than text detected in a previous video frame,
   said text detection module further configured to receive a second video frame,
   detect the text therein by looking for text patterns ad generate a second timestamp if the detected text in said second video frame is different than text detected in said first video frame; and
   an Optical Character Recognition module configured to produce a string of text words representing said detected text;
wherein said audio subsystem comprises:
   a source of audio signals comprising an audio representation of said detected text;
   an audio buffering module configured to receive and store said audio signal between said first and second timestamps; and
   an audio words separation module configured to separate said stored audio signal into a string of audio words;
   said matching module configured to receive said string of text words and said string of audio words and store each pair of matching text word and audio word in said database.

2. A method of automatic generation of a database for speech recognition, comprising:
   a. producing in synchronization a string of text words and a corresponding string of audio words;
   b. matching pairs of text word and audio word in said respective strings; and
   c. storing said matched pairs in a database;
   wherein said producing in synchronization a string of text words and a corresponding string of audio words comprises:
      (i) receiving a first video frame comprising text;
      (ii) detecting the text in said first video frame by looking for text patterns;
      (iii) generating a first timestamp if the text detected in said first video frame is different than text detected in a previous video frame and storing said generated first timestamp in an audio signals buffer;
      (iv) producing a string of text words representing said detected text;
      (v) receiving a second video frame comprising text;
      (vi) detecting the text in said second video frame by looking for text patterns;
      (vii) generating a second timestamp if the text detected in said second video frame is different than text detected in said first video frame;
      (viii) receiving audio signals comprising an audio representation of said detected text between said first and second timestamps;
      (ix) storing said received audio signals and said second timestamp in said buffer; and
      (x) separating said stored-audio signal stored in said buffer between said first and second timestamps into a string of audio words.

3. A non-transitory computer-readable medium encoding instructions that, when executed by data processing apparatus, cause the data processing apparatus to perform operations comprising:
   a. producing in synchronization a string of text words and a corresponding string of audio words;

b. matching pairs of text word and audio word in said respective strings; and
c. storing said matched pairs in a database;

wherein said producing in synchronization a string of text words and a corresponding string of audio words comprises:

(i) receiving a first video frame comprising text;
(ii) detecting the text in said first video frame by looking for text patterns;
(iii) generating a first timestamp if the text detected in said first video frame is different than text detected in a previous video frame and storing said generated first timestamp in an audio signals buffer;
(iv) producing a string of text words representing said detected text;
(v) receiving a second video frame comprising text;
(vi) detecting the text in said second video frame by looking for text patterns;
(vii) generating a second timestamp if the text detected in said second video frame is different than text detected in said first video;
(viii) receiving audio signals comprising an audio representation of said detected text between said first and second timestamps;
(ix) storing said received audio signals and said second timestamp in said buffer; and
(x) separating said audio signal stored in said buffer between said first and second timestamps into a string of audio words.

\* \* \* \* \*